J. H. PEARSON.

APPARATUS FOR SURFACING LENSES.

APPLICATION FILED MAR. 24, 1919.

Reissued June 10, 1919. 14,666.

INVENTOR.
JOHN HARVEY PEARSON.

BY
Lockwood & Lockwood
ATTORNEYS

THE NORRIS PETERS CO., PHOTO-LITHO., WASHINGTON, D. C.

UNITED STATES PATENT OFFICE.

JOHN HARVEY PEARSON, OF INDIANAPOLIS, INDIANA, ASSIGNOR TO ONEPIECE BIFOCAL LENS COMPANY, OF INDIANAPOLIS, INDIANA, A CORPORATION.

APPARATUS FOR SURFACING LENSES.

14,666. Specification of Reissued Letters Patent. Reissued June 10, 1919.

Original No. 1,288,156, dated December 17, 1918, Serial No. 151,602, filed February 28, 1917. Application for reissue filed March 24, 1919. Serial No. 284,839.

*To all whom it may concern:*

Be it known that I, JOHN HARVEY PEARSON, a citizen of the United States, residing at Indianapolis, in the county of Marion and State of Indiana, have invented a new and useful Apparatus for Surfacing Lenses, of which the following is the specification.

The object of this invention is to render uniform the action of an element employed for grinding or polishing the surface of a lens or lens blank, particularly where the surfacing element treats a circular path of the lens or blank.

When the surfacing element treats a circular path over a lens blank, the outer portion of said element treats a greater length or extent of surface than the inner portion thereof and, therefore, the lens blank being surfaced by the inner portion of the surfacing element, will be ground or polished away proportionately more rapidly than the path treated by the outer portion of said element, assuming the element to be homogeneous and set to a uniform pressure. The result is a very slight lack of uniformity in the action of the surfacing element and inaccuracy in the lens blank. To overcome this difficulty is the object of this invention.

The chief feature of the invention consists in providing means for subjecting the outer portion of said surfacing element to a greater pressure than the inner portion thereof. The increase of pressure on the outer portion of said element should correspond with and be proportionate to the increase of travel of the outer portion of the surfacing element on the lens blank. Therefore, if the surfacing element treated the lens immediately around a center, the extra pressure on the outer portion of the element should be greater than if it treated in a longer and annular path.

Figure 1:
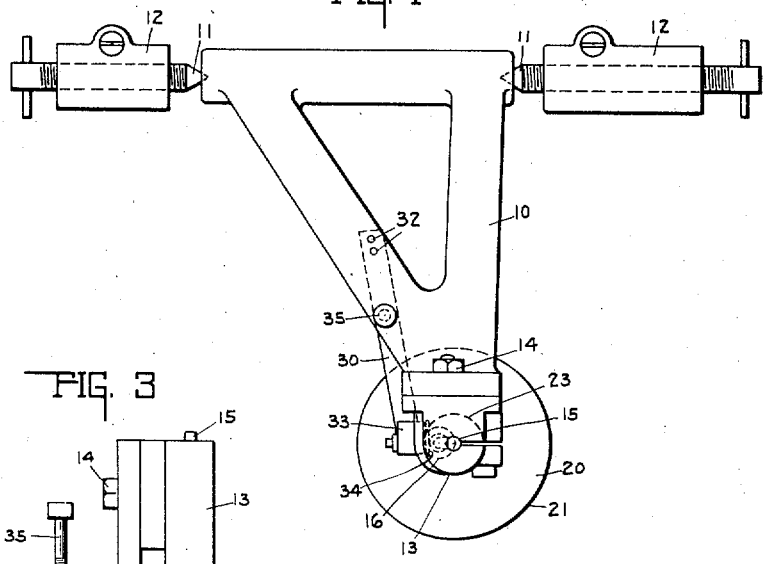
Figure 3:
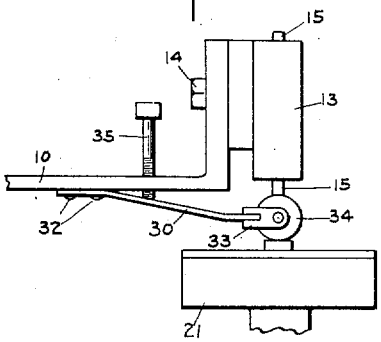
Figure 3:
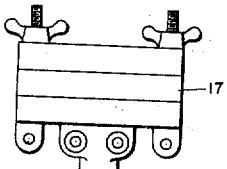
Figure 2:
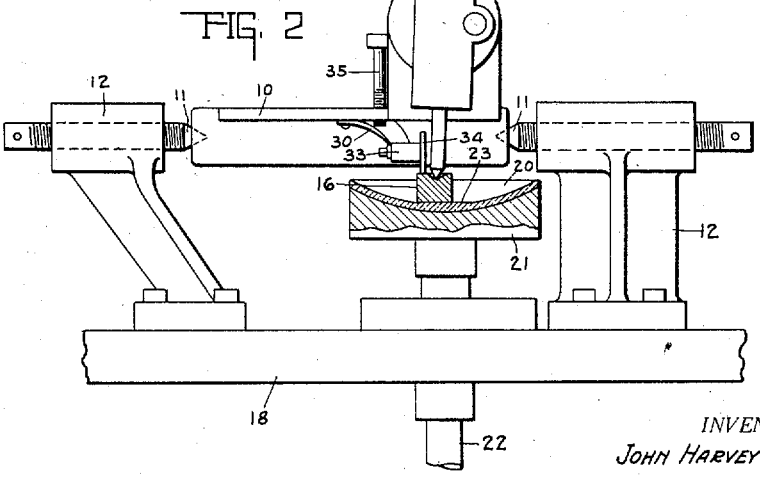

The full nature of the invention will be understood from the accompanying drawings and the following description and claims:

In the drawings, Figure 1 is a plan view of apparatus for polishing the inner, minor or reading surface of a bifocal lens. Fig. 2 is a front elevation thereof with the lens holder and lens blank and surfacing element being shown in central vertical section. Fig. 3 is an elevation of a portion of the left-hand side thereof.

There is shown herein a frame 10 which is substantially triangular and is mounted upon two adjustable center pins 11 which are located in bearings 12 rising from some suitable table 18, seen in Fig. 2. A head 13 is secured by a screw 14 to the free end of said frame 10, as seen in Fig. 3, in which a pin 15 is mounted which rides upon, holds and operates the polishing element 16. The pin and polishing element are made in the usual way and are weighted by a weight 17 on the upper end of the pin.

A lens blank 20 is secured upon a lens holder 21 carried on a shaft 22 extending through the table 18, said parts being constructed and operated in the usual manner so that the lens holder and lens blank will be rotated and cause the polishing of the inner, minor or reading surface 23 of the bifocal lens blank 20.

Since the grinding element of said inner surface of the bifocal lens is about one-half the diameter of said surface, it treats the lens immediately around the center thereof and ordinarily would cause a more rapid polishing or grinding, if the grinding element were used nearer the center of said central lens surface than near its periphery, because of the difference in the amount of surface treated by the inner and outer portions of the polishing or grinding element. While a polishing machine and apparatus is here shown, the invention is not limited to merely a polishing apparatus.

A flat spring 30 is secured at 32 to the frame 10 on its underside and the free end of the spring carries a bearing 33 in which an anti-friction roller 34 is mounted and said parts are arranged so that said roller will ride and press upon the outer upper surface of the polishing or grinding element. The extent of pressure is controlled by a set screw 35 that operates through the frame 10, as seen in Fig. 3, and bears down upon the spring 30. The desired extent of this pressure can, therefore, be adjusted, after it has been determined from the operation of the machine. The farther the circular path of treatment of the grinding or polishing element is from the center, the less this pressure need be, theoretically speaking.

The invention claimed is:

1. Apparatus for surfacing lenses and the like including a surfacing element, means for operating said element so that one portion of the element will travel over a greater surface of the lens than another portion of the element, and means for exerting pressure on the portion of the element having the greatest amount of travel so as to equalize the action of the element on the lens.

2. Apparatus for surfacing lenses and the like including a surfacing element for engaging and treating the surface of the lens, means for causing said element to treat a circular path on said lens for surfacing the same eccentrically of said element, and means exerting pressure on the outer portion of said element so as to equalize the action of the element on the lens.

3. Apparatus for surfacing lenses and the like including a surfacing element of a less diameter than the surface to be treated, means for causing said element to treat a circular path on a lens for surfacing the same, and spring-pressed means bearing down upon the outer portion of the grinding element.

4. Apparatus for surfacing lenses and the like including a rotatable lens holder, a surfacing element, means for holding said element eccentrically of the axis of said lens holder so that it will treat a circular path on the lens, and means for exerting pressure on the outer portion of said element so as to equalize the action of the element on the lens.

5. Apparatus for surfacing lenses and the like including a surfacing element, means for causing said element to treat a circular path on said lens for surfacing the same, and a yieldingly mounted roller operating under pressure and bearing down upon the outer portion of said grinding element.

6. Apparatus for surfacing lenses and the like including a surfacing element, means for causing said element to treat a circular path on said lens for surfacing the same, a spring, a roller carried by said spring so as to press down upon the outer portion of the grinding element, and means for adjusting the tension of said spring.

7. Apparatus for surfacing lenses and the like including a lens holder, a surfacing element, a movable frame for controlling the position of the surfacing element, a spring secured to the frame, a roller carried by the free end of the spring so as to bear down upon the outer portion of the surfacing element, and a set screw in the frame adapted to engage the spring to adjust its tension.

In witness whereof, I have hereunto set my hand, at Indianapolis, Indiana, this 6th day of March, 1919.

JOHN HARVEY PEARSON.

Copies of this patent may be obtained for five cents each, by addressing the "Commissioner of Patents, Washington, D. C."